United States Patent
Sambhwani et al.

(10) Patent No.: US 8,068,464 B2
(45) Date of Patent: Nov. 29, 2011

(54) VARYING SCRAMBLING/OVSF CODES WITHIN A TD-CDMA SLOT TO OVERCOME JAMMING EFFECT BY A DOMINANT INTERFERER

(75) Inventors: Sharad Deepak Sambhwani, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 993 days.

(21) Appl. No.: 11/553,973

(22) Filed: Oct. 27, 2006

(65) Prior Publication Data
US 2007/0104085 A1 May 10, 2007

Related U.S. Application Data

(60) Provisional application No. 60/731,025, filed on Oct. 27, 2005.

(51) Int. Cl.
*H04B 7/216* (2006.01)
*H04J 11/00* (2006.01)

(52) U.S. Cl. ......... 370/335; 370/209; 370/342; 370/252

(58) Field of Classification Search .................. 370/208, 370/209, 320, 203, 329, 330, 335–336, 342–343, 370/252; 375/267, E1.02; 714/738
See application file for complete search history.

(56) References Cited

U.S. PATENT DOCUMENTS

| | | | |
|---|---|---|---|
| 5,757,767 A | 5/1998 | Zehavi | |
| 5,781,541 A | 7/1998 | Schneider | |
| 5,848,060 A | 12/1998 | Dent | |
| 6,038,450 A | 3/2000 | Brink et al. | |
| 6,091,757 A * | 7/2000 | Cudak et al. | 375/130 |
| 6,233,231 B1 * | 5/2001 | Felix et al. | 370/335 |
| 6,370,182 B2 | 4/2002 | Bierly et al. | |
| 6,374,122 B1 | 4/2002 | Leung | |
| 6,388,998 B1 | 5/2002 | Kasturia | |
| 6,396,822 B1 | 5/2002 | Sun et al. | |
| 6,741,550 B1 * | 5/2004 | Shin | 370/209 |
| 6,845,238 B1 | 1/2005 | Müller | |
| 6,965,633 B2 * | 11/2005 | Sun et al. | 375/145 |
| 6,973,062 B1 * | 12/2005 | Han | 370/335 |

(Continued)

FOREIGN PATENT DOCUMENTS

CN  1353887 A  6/2002

(Continued)

OTHER PUBLICATIONS

Monogioudis, P., et al. "Intelligent Antenna Solutions for UMTS: Algorithms and Simulation Results." IEEE Communications Magazine, IEEE Service Center, New York, NY, US, vol, 42, No. 10, Oct. 2004, pp. 28-39.

(Continued)

*Primary Examiner* — Kwang B Yao
*Assistant Examiner* — Candal Elpenord
(74) *Attorney, Agent, or Firm* — Albert J. Harnois, Jr.; Mary A. Fales (57) ABSTRACT

An apparatus and method for varying scrambling codes within a radio frame time slot for a user device in a wireless communication environment including detecting interference of the user device; and varying a scrambling code sequence employed to multiply a Walsh code assigned to the user device at least once within a transmission time slot.

24 Claims, 10 Drawing Sheets

U.S. PATENT DOCUMENTS

| | | |
|---|---|---|
| 6,980,527 B1 | 12/2005 | Liu et al. |
| 6,996,056 B2 | 2/2006 | Chheda et al. |
| 7,099,372 B2 | 8/2006 | Nieczyporowicz et al. |
| 7,123,579 B1 * | 10/2006 | Lyu .......................... 370/203 |
| 7,239,847 B2 | 7/2007 | Attar et al. |
| 7,272,110 B2 | 9/2007 | Lee et al. |
| 7,298,805 B2 | 11/2007 | Walton et al. |
| 7,324,429 B2 | 1/2008 | Walton et al. |
| 7,391,755 B2 | 6/2008 | Gopalakrishnan et al. |
| 7,411,899 B2 | 8/2008 | Kavak et al. |
| 7,650,154 B2 | 1/2010 | Pedersen et al. |
| 2002/0018520 A1 * | 2/2002 | Eidson ......................... 375/150 |
| 2002/0067759 A1 | 6/2002 | Ertel et al. |
| 2002/0197997 A1 | 12/2002 | Attar et al. |
| 2003/0031119 A1 | 2/2003 | Kim et al. |
| 2003/0202563 A1 | 10/2003 | Das et al. |
| 2004/0037238 A1 | 2/2004 | Schiff et al. |
| 2004/0071115 A1 | 4/2004 | Earnshaw et al. |
| 2004/0131007 A1 * | 7/2004 | Smee et al. .................. 370/208 |
| 2004/0146093 A1 | 7/2004 | Olson et al. |
| 2004/0179544 A1 | 9/2004 | Wilson et al. |
| 2004/0184570 A1 | 9/2004 | Thomas et al. |
| 2004/0252665 A1 | 12/2004 | Clark et al. |
| 2004/0257975 A1 | 12/2004 | Proctor, Jr. |
| 2005/0105485 A1 | 5/2005 | Cleveland et al. |
| 2005/0111408 A1 | 5/2005 | Skillermark et al. |
| 2005/0128985 A1 | 6/2005 | Liberti et al. |
| 2005/0226414 A1 | 10/2005 | Lee et al. |
| 2006/0013250 A1 | 1/2006 | Howard et al. |
| 2006/0045170 A1 * | 3/2006 | van Rensburg et al. ...... 375/148 |
| 2007/0019535 A1 | 1/2007 | Sambhwani et al. |
| 2007/0249355 A1 | 10/2007 | Kang et al. |
| 2007/0270155 A1 | 11/2007 | Nelson et al. |
| 2008/0069015 A1 | 3/2008 | Walton et al. |
| 2008/0280611 A1 | 11/2008 | Miklos et al. |

FOREIGN PATENT DOCUMENTS

| | | |
|---|---|---|
| CN | 1378357 A | 11/2002 |
| EP | 0957604 A1 | 11/1999 |
| EP | 1396956 A1 | 3/2004 |
| GB | 2378857 A | 2/2003 |
| JP | 2002515203 T | 5/2002 |
| JP | 2003134550 | 5/2003 |
| JP | 2004248315 A | 9/2004 |
| JP | 2005110130 A | 4/2005 |
| JP | 2007512773 T | 5/2007 |
| KR | 20010043533 | 5/2001 |
| KR | 1020040010782 | 1/2004 |
| WO | WO9737456 A2 | 10/1997 |
| WO | 00/74255 A1 | 12/2000 |
| WO | 0120942 | 3/2001 |
| WO | 0122607 | 3/2001 |
| WO | WO01072081 | 9/2001 |
| WO | WO0203561 A1 | 1/2002 |
| WO | 02/056517 A1 | 7/2002 |
| WO | 03081930 | 10/2003 |
| WO | 2004010573 | 1/2004 |
| WO | WO2005053186 A1 | 6/2005 |

OTHER PUBLICATIONS

International Search Report—PCT/US06/060335—International Search Authority—European Patent Office—May 8, 2007.

Written Opinion—PCT/US06/060335—International Search Authority—European Patent Office, Munich—May 8, 2007.

International Preliminary Report on Patentability—PCT/US06/060335—International Search Authority—The International Bureau of WIPO—Geneva, Switzerland—Apr. 29, 2008.

"cdma2000 High Rate Packet Data Air Interface Specification." TIA IS-856, V.2, Oct. 27, 2000.

"Spreading and Modulation (TDD)", 3GPP TS 25.223, V.6.0.0 (Dec. 2003).

Adaptive Antennas and MIMO Systems for Wireless Communications; Intelligent Antenna Solutions for UMTS: Algorithms and Simulation Results P-28-29 PD:00.10.2004 VN: 2460.

Tango GG., "statistical multiplexing", http://www.moon-soft.com/program/bbs/readelite27918.htm, Apr. 3, 2001.

"Universal Mobile Telecommunications System (UMTS)," ETSI Standards, European Telecommunications Standards Institute, 3GPP TS 25.331 Version 6.5.0 Release 6, vol. 3-R2, No. V650, Mar. 2005.

* cited by examiner

VARYING SCRAMBLING/OVSF CODES WITHIN A TD-CDMA SLOT TO OVERCOME JAMMING EFFECT BY A DOMINANT INTERFERER

BACKGROUND

I. Field

The following description relates generally to wireless communications, and more particularly to increasing interference variation to reduce a manning effect caused by a dominant interferer in a TD-CDMA wireless communication environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demand on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subband are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate predication for one or more mobile terminals.

Conventional TDD-CDMA systems employ a static scrambling code sequence throughout one or more radio frames, which can result in increased interference between users with similar code assignments in different sectors. Thus, there is an unmet need in the art for a system and/or methodology of improving throughput in such wireless communication systems.

SUMMARY

The following presents a simplified summary of one or more embodiments in order to provide a basic understanding to such embodiments. This summary is not an extensive overview of all contemplated embodiments, and is intended to neither identify key or critical elements of all embodiments nor delineate the scope of any or all embodiments. Its sole purpose is to present some concepts of one or more embodiment in a simplified form as a prelude to the more detailed descriptions that is presented later.

In accordance with one or more embodiments and corresponding disclosure thereof, various aspects are described in connection with performing effective code hoping on a symbol-to-symbol basis in a wireless communicating environment. According to one aspect, effective codes (e.g., Walsh code-scrambling code combinations) can be varied and/or recycled within a time slot of a transmission frame to increase interference diversity and reduce a jamming effect caused by a dominant interferer in a sector near an interfered user's sector.

According to one or more embodiments, a method of varying scrambling codes within a radio frame time slot for a user device in a wireless communication environmental can comprised detecting interference of the user device and carding a scrambling code sequence employed to multiple a Walsh code assigned to the user device at least once within a transmission time slot in response to the detected interference. The method can further comprised employing at least two different scrambling code sequence sets within the time slot, which can be 2560 chips in length and can be divided into 160 16-chip segments. Thus, according to the method, anywhere from 2 to 160 different scrambling code sequence sets can be employed to scramble the 160 16-chip segments in a given time slot. Moreover, feedback can be employed to continuously evaluate interference levels and to adjust a frequency of scrambling code variation within a time slot until interference is controlled (e.g., reduced to a level at or below a predetermined threshold level, . . . ).

According to another aspect, an apparatus that facilitates effective code hopping in a wireless communication environment can comprise a memory that stores information comprising scrambling code variation patterns, and a processor, coupled to the memory, that varies scrambling code assignments to a user device at least once per time slot during a transmission frame. The apparatus can further comprise an interference monitoring component that assesses when an interference level is above a predetermined threshold level, and a recycling pattern generator that generates scrambling code sequence variation patterns for allocation to segments within the time slot during a transmission event. The processor can determine an appropriate scrambling code recycling pattern to apply to a time slot for the user device based at least in part on information received from the interference monitoring component. Additionally, the memory can store one or more lookup tables comprising information related to user device identity, Walsh code assignments, scrambling code allocations, detected interference events, scrambling code recycling patterns, and the like.

According to yet another aspect an apparatus that facilitates scrambling code variation within a time slot in a wireless communication environment can comprise means for detecting interference at the user device caused by a dominant user device with a similar code assignment in another sector, and means for varying scrambling code sequences used to multiply Walsh codes assigned to the user device during a communication time slot. The means for varying scrambling code sequences can employ at least two different scrambling code sequences to vary the scrambling code sequences allocated to the user device at least once per time slot. The apparatus can further comprise means for determining whether scrambling code sequence variation has reduced interference below a predetermined threshold level, and means for increasing scrambling code sequence variation in the same or a subsequent time slot if interference has not been reduce to a level below the predetermined threshold level.

According to yet another aspect, a computer-readable medium having stored thereon computer-executable instructions for detecting interference at a user device and for varying a scrambling code sequence, employed to multiply a Walsh code assigned to the user device, at least once within a transmission time slot. The computer-readable can further comprise instructions for employing at least two different scrambling code sequence sets within the time slot, and instructions for determining whether detected interference has been reduced to a level below a predetermined threshold level after scrambling code variation. The computer-readable medium can still further comprise instructions for increasing a frequency of scrambling code variation within the time slot upon a determination that interference has not been reduced to a level below the predetermined threshold level.

According to another aspect, processor is described that executes instructions for performing effective code hopping within a time slot of a radio frame in a communication environment, the instructions comprising detecting interference at a user device, and varying a scrambling code sequence, employed to multiply a Walsh code assigned to the user device, at least once within a transmission time slot. The processor can further comprise instructions for employing at least two different scrambling code sequence sets within the time slot, for determining whether detected interference has been reduced to a level below a predetermined threshold level after scrambling code variation, and for increasing a frequency of scrambling code variation within the time slot upon a determination that interference is not reduced to a level below the predetermined threshold level.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Various embodiments are now described with reference to the drawings, wherein like reference numerals are used to refer to like elements throughout. In the following descriptions, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, remote terminal, access terminal, user terminal, user agent, user device, mobile device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Figure 1:
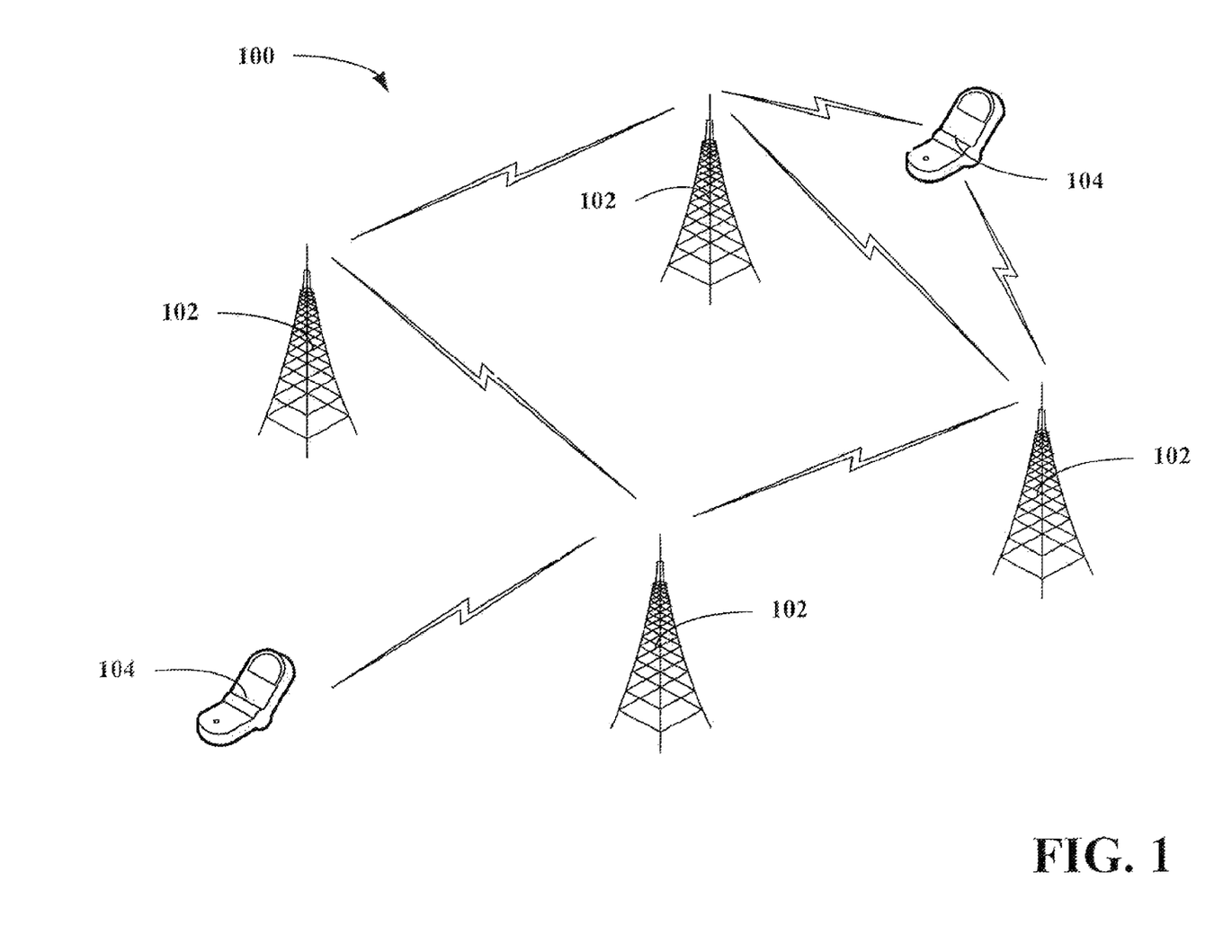
FIG. 1 illustrates a wireless network communication system in accordance with various embodiments presented herein.

Referring now to FIG. 1, a wireless network communication system 100 in accordance with various embodiments presented herein is illustrated. Network 100 can comprise one or more base stations 102 in one or more sectors that receive, transmit, repeat, etc., wireless communication signals to each other and/or to one or more mobile device 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless network 100.

TD-CDMA employs Walsh codes, also called orthogonal variable spreading factor (OVSF) codes, to encode a communication channel in both the forward link (FL) and the reverse link (RL). A Walsh code is an orthogonal code that facilitates uniquely identifying individual communication channels, as will be appreciated by one skilled in the art. A signal encoded using a Walsh code is typically interpreted as noise by a receiver that does not employ the same Walsh code to decode the signal. In traditional 3GPP TDD-CDMA systems (e.g., employing a high chip-rate of 3.84 Mcps), a cell-specific scrambling code is varied once per radio frame (e.g., every 10 ms). When a dominant interferer, such as a user device in another sector, is introduced, a jamming effect can occur due to a lack of interference variation over a radio frame. Additionally, the scrambling code is fixed for an entire period of allocation when employing such conventional interframe code variation schemes. In order to facilitate providing greater interference variation, systems and method described herein can facilitate varying a short scrambling code-OVSF code combination (e.g., an "effective code") within a frame and/or within a time slot, such that the effective code can be recycled every N symbols per slot, where N is an integer, according to an intraframe recycling scheme. In this manner, various aspects set forth herein can mitigate the jamming effects associated with conventional systems that employ an inter frame variation scheme recycle a scrambling code every two radio frames and the slow averaging effect associated therewith when a dominant interferer is present.

In accordance with one or more aspects, a short scrambling code-OVSF code combination can be hopped from symbol to symbol in a TD-CDMA communication system. Such symbols can have, for instance, a 16-chip duration, and the code combination can repeat itself every N symbols, where N is an integer. Thus, interference can be varied from symbol to symbol to ensure sufficient interference variation, and thus an adequate averaging effect, in the presence of a dominant interferer in order to surmount the jamming effect that can occur in conventional systems.

Figure 2:
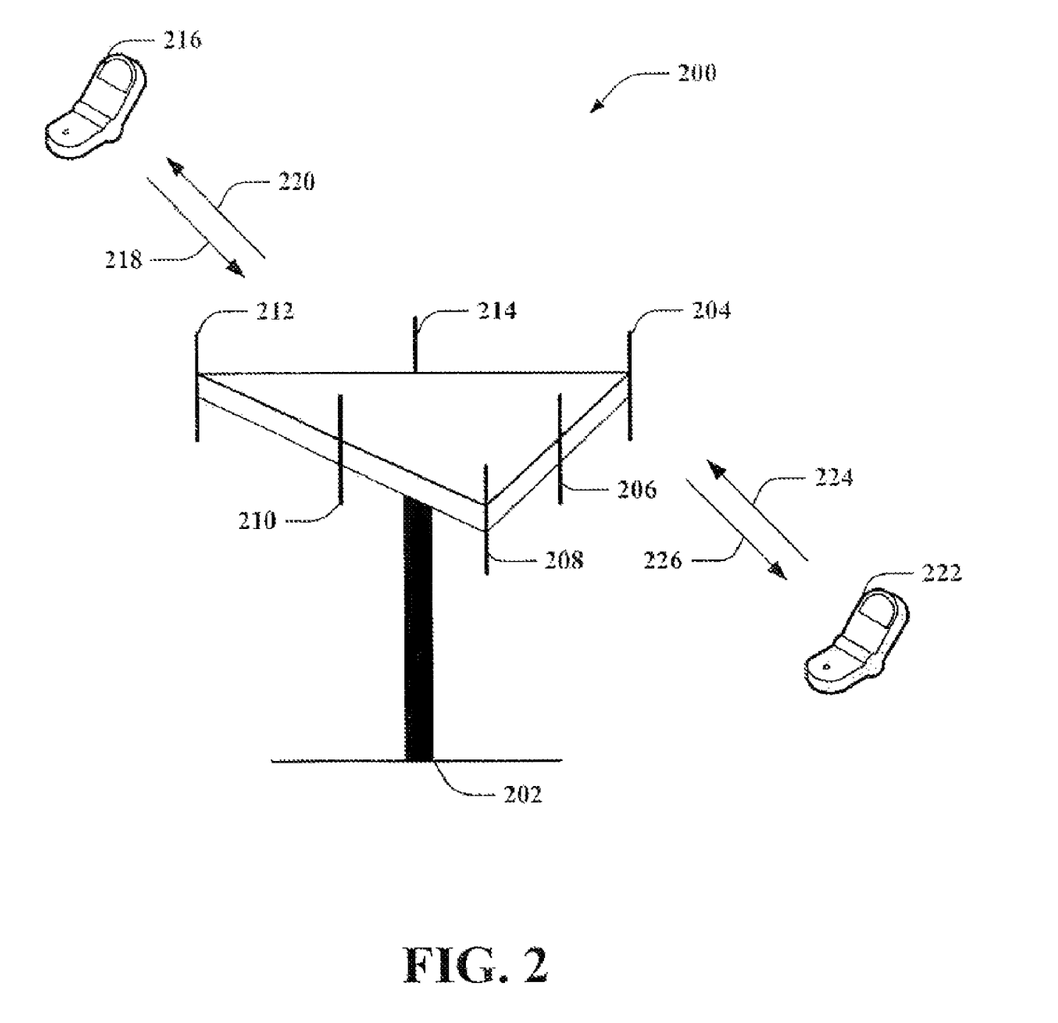
FIG. 2 is an illustration of a multiple access wireless communication system that can be employed to transmit effective codes according to an intraframe recycling protocol according to one or more embodiments is illustrated.

Referring now to FIG. 2, a multiple access wireless communication system 200 that can be employed to transmit effective codes according to an intraframe recycling protocol according to one or more embodiments is illustrated. A 3-sector base station 202 includes multiple antenna groups, one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 220 and receive information from mobile device 216 over reverse link 218. Mobile device 222 is in communication with antennas 204 and 206, where antennas 204 and 206 transmit information to mobile device 222 over forward link 226 and receive information from mobile device 222 over reverse link 224.

Each group of antennas and/or the area in which they are designated to communicate is often referred to as a sector of base station 202. In an embodiment, antenna groups each are designed to communicate to mobile devices in a sector of the areas covered by base station 202. In communication over forward links 220 and 226, the transmitting antennas of base station 202 can utilize beam-forming techniques in order to improve the signal-to-noise ratio of forward links for the different mobile devices 216 and 222. Additionally, a base station using beam-forming to transmit to mobile devices scattered randomly through its coverage area causes less interference to mobile devices in neighboring cells/sectors than a base station transmitting through a single antenna to all mobile devices in its coverage area. A base station may be a fixed station used for communicating with the terminals and may also be referred to as an access point, a Node B, or some other terminology. A mobile device may also be called a mobile station, user equipment (UE), a wireless communication device, terminal, access terminal, user device, or some other terminology.

Figure 3:
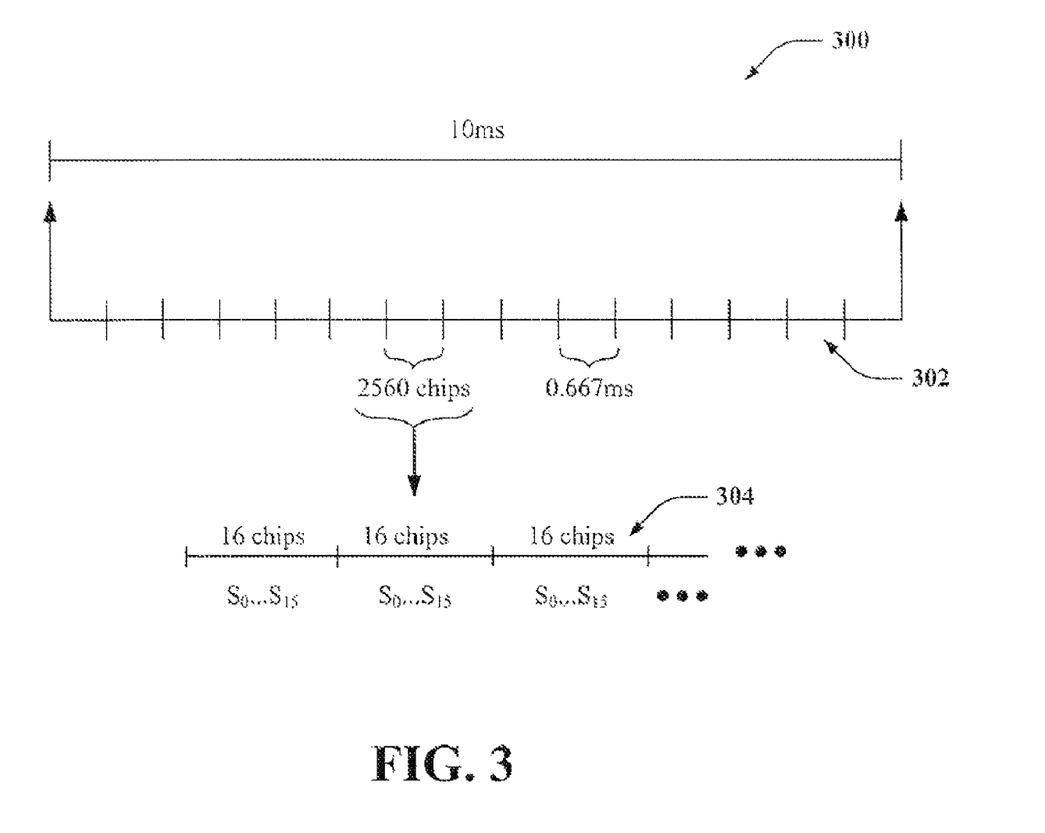
FIG. 3 illustrates a radio frame comprising a static scrambling code recycling scheme, in accordance with various aspects.

FIG. 3 illustrates a radio frame 300 comprising a static scrambling code recycling scheme, in accordance with various aspects. Radio frame 300 is approximately 10 ms in duration and comprises 15 time slots 302, each of which in turn is approximately 667 microseconds in duration. Each time slot 302 comprises 2560 chips, which can be subdivided into 16-chip segments 304, for a total of 160 segments per time slot. A series of scrambling codes $S_0$ through $S_{15}$ are illustrated below each segment 304. As is standard with conventional systems, the same set of scrambling codes $S_0$-$S_{15}$ are employed for all segments 304 in a time slot 302, and/or for all time slots in radio frame 300. That is, scrambling code sequence variation typically occurs only once per radio frame in conventional 3GPP TDD-CDMA systems. This can result in all jamming effect when a dominant interferer in another sector is present, due to a lack of interference variation by the interferer over a radio frame. Additionally, the Walsh code assigned to a user device and the dominant interferer remains assigned thereto for the entire period of allocation, such that the jamming effect is carried through. Thus, significant jamming can occur due to cross-correlation between effective spreading codes (e.g., Walsh code×short scrambling code) of two users in different cells or sectors on the same uplink or downlink time slot. Variation of scrambling code-Walsh code combinations has heretofore been implemented only once every radio frame or every two radio frames due to processing constraints and high overhead costs.

Figure 4:
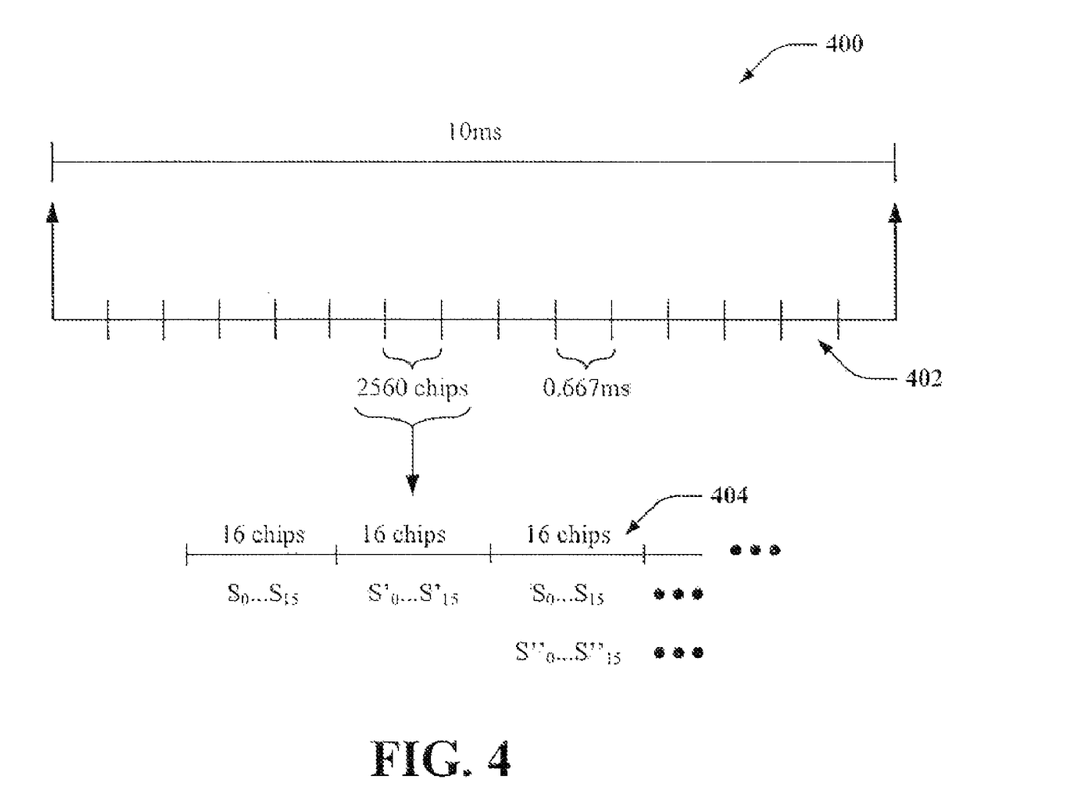
FIG. 4 is an illustration of a radio frame wherein effective codes are hopped and/or varied from symbol to symbol in a TDD-CDMA wireless communication environment, in accordance with various aspects described herein.

FIG. 4 is an illustration of a radio frame 400 wherein effective codes are hopped and/or varied from symbol to symbol in a TDD-CDMA wireless communication environment, in accordance with various aspects described herein. In order to mitigate jamming effects caused by cross-correlation of effective codes by a dominant interferer as set forth above, scrambling codes can be varied within a time slot in order to provide intraframe scrambling code hopping to reduce cross-correlation. For instance, radio frame 400 can comprise 15 time slots 402, which in turn can respectively comprise 160 16-chip segments 404. Scrambling codes can be assigned and varied within a time slot. For example, a first set of scrambling codes $S_0$-$S_{15}$ can be allocated to a first segment, and upon transmission of a second segment, a new set of scrambling codes $S'_0$-$S'_{15}$ can be allocated. The initial set of scrambling codes $S_0$-$S_{15}$ can be re-allocated in a subsequent code segment and so on, in order to facilitate varying effective codes within the time slot to mitigate jamming at a base station receiver.

According to a related example, scrambling codes can be varied such that a first set of scrambling codes $S_0$-$S_{15}$ can be applied to a first segment, a second set of scrambling codes $S'_0$-$S'_{15}$ can be applied to a second segment, a third set of scrambling codes $S''_0$-$S''_{15}$ can be allocated to a third segment, and so on. Indeed, any permutation of scrambling codes can be employed to vary effective codes within a time slot, such that scrambling codes can be hopped anywhere from 1 to 160 times within a time slot. The ability to achieve such variation can be partly accredited to recent advances in processing speed, memory capacity, and the like. Moreover, recycling patterns can be any desired pattern such that scrambling code sequences can be reused within a time slot.

According to other examples, a scrambling code sets can be varied between 4 to 16 times within a single time slot 402, and such variations can be equally spaced across the time slot or can be randomly or pseudo-randomly allocated. For instance, a scrambling code sequence can be allocated at segment 0, and variation thereof can occur at segment 39, at segment 79, at segment 119, and again at segment 159, if desired. Alternatively, scrambling code sequence variations can occur at segments 21, 98, 131, or any other suitable or desired point in time slot 402. Furthermore, scrambling code variations need not be performed according to a fixed schedule across time slots within a radio frame or frames, but rather a pseudo-random hopping schedule can be employed to mitigate cross-correlation between users assigned to the same Walsh code sets in different sectors.

Figure 5:
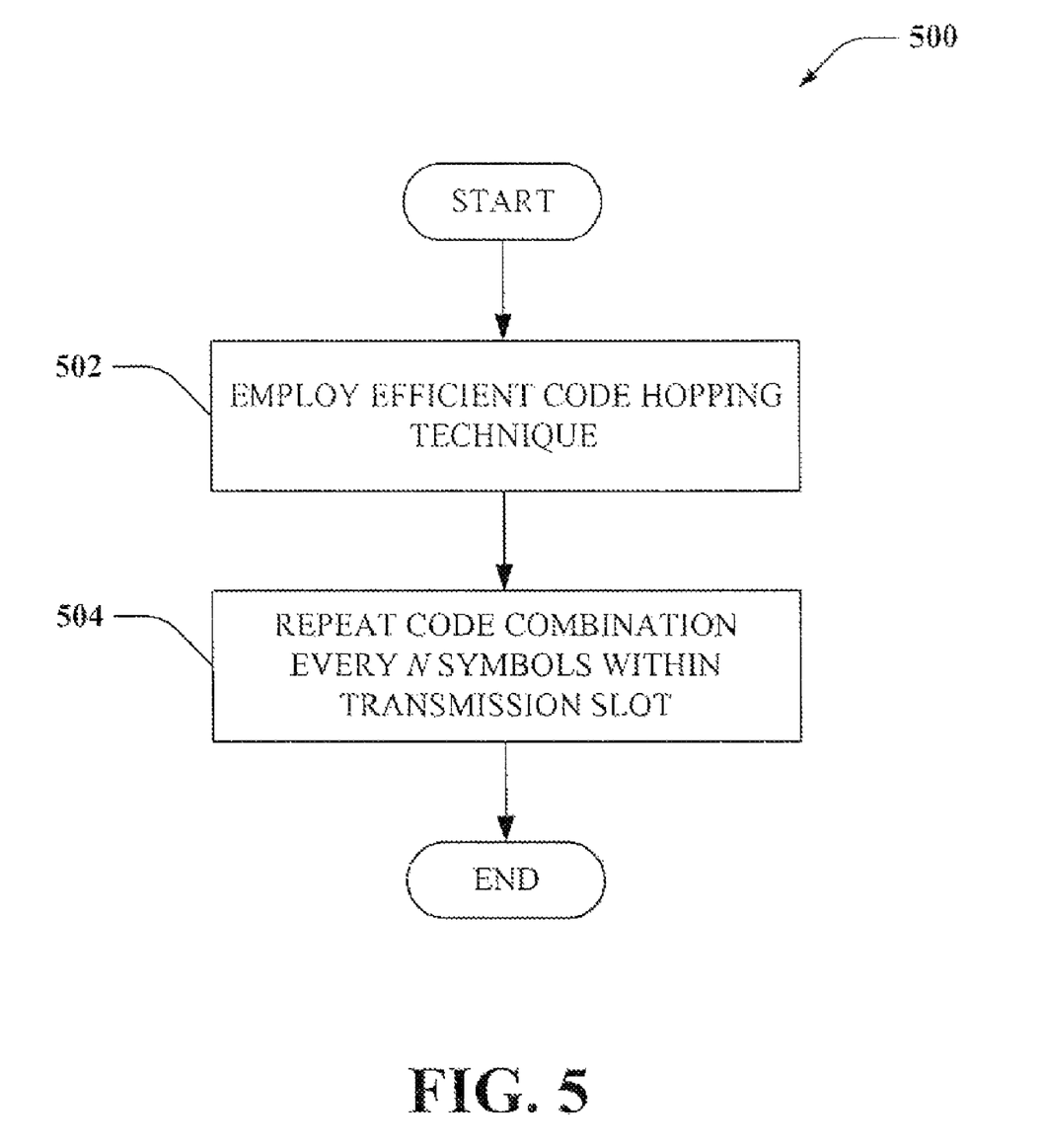
FIG. 5 is an illustration of a methodology for mitigating jamming due to a cross-correlation of effective codes assigned to users in different sectors, in accordance with one or more aspects.
Figure 6:
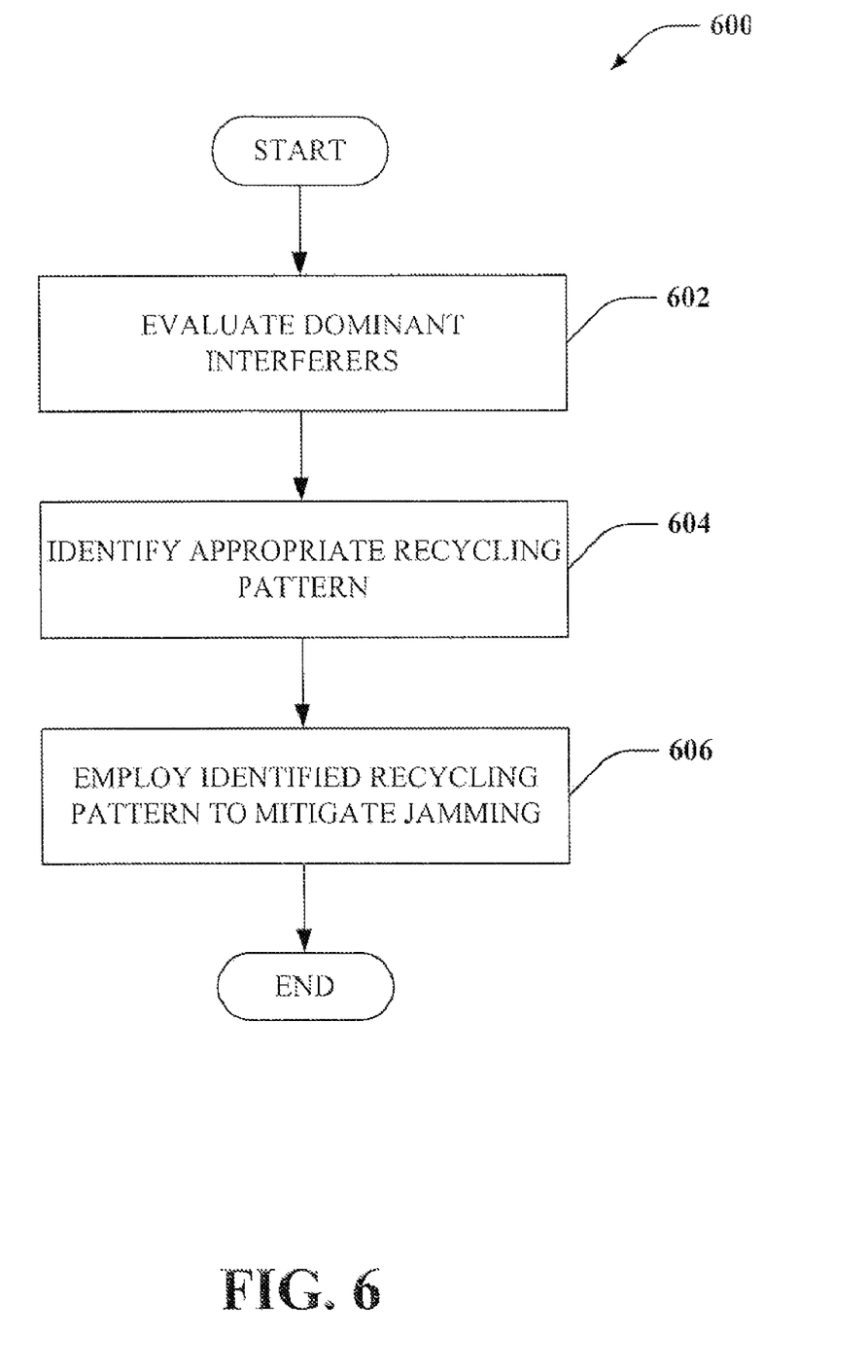
FIG. 6 illustrates a methodology for dynamically evaluating interference and applying an appropriate interframe scrambling code recycling pattern to mitigate the interference, in accordance with various aspects.
Figure 7:
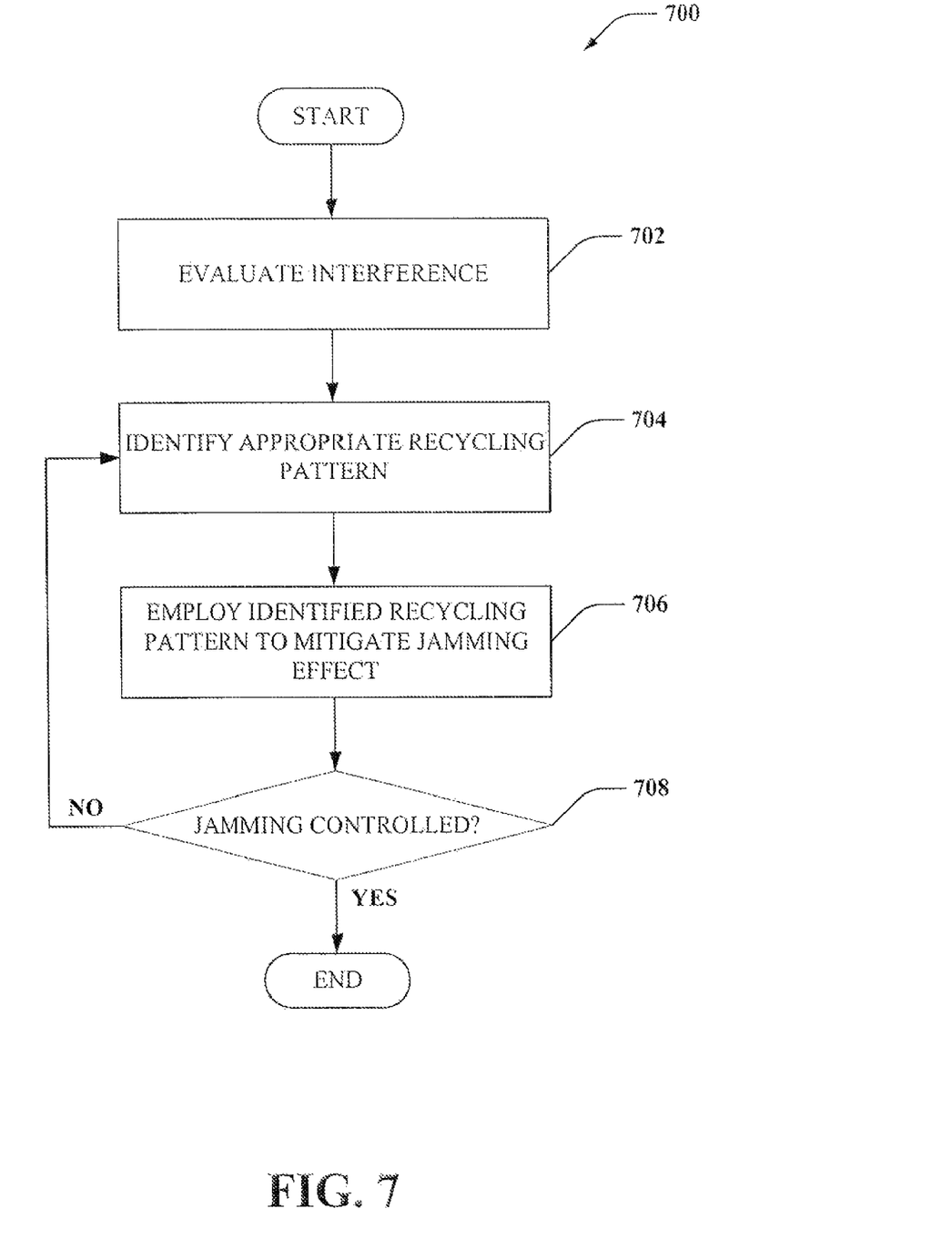
FIG. 7 illustrates a methodology for employing a interference level feedback information to facilitate dynamically increasing interference diversity and varying effective codes within a time slot of a radio frame, in accordance with one or more aspects.

Referring to FIGS. 5-7, methodologies relating to varying scrambling codes within a time slot in a UMTS TDD wireless environment, an OFDM environment, an OFDMA environment, a CDMA environment, a TDMA environment, a TDD environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 5 is an illustration of a methodology 500 for mitigating jamming due to a cross-correlation of effective codes assigned to users in different sectors, in accordance with one or more aspects. At 502, a hopping technique for varying effective encodes (e.g., Walsh code×scrambling code product) can be employed. Such technique can be, for instance, varying a set of scrambling codes periodically throughout a time frame to mitigate cross-correlation between codes assigned to user devices in different sectors wherein one user device is a dominant interferer. At 504, such scrambling codes can be varied every N symbols, or 16-chip segments, within a time frame, where N is an integer. For example, a first set of scrambling codes can be employed for a first segment, an a second set of scrambling codes can be substituted for the first set of scrambling codes at some subsequent segment within a time slot.

To further this example, a typical radio frame comprises 15 time slots, each of which further comprises 160 16-chip long segments. Thus, anywhere from 2 to 160 different scrambling code sequences can be employed within a time slot to vary effective code combinations (e.g., Walsh code multiplied by scrambling code) to increase interference diversity. According to an aspect, two sets of scrambling codes can be employed per time slot and can be alternated every one or more segments to mitigate jamming at a base station receiver. According to another aspect, 16 scrambling code sets can be employed within a time frame to vary effective codes therein every tenth segment, etc. Thus, it will be understood that any permutation of different and/or recycled scrambling code sets can be utilized to improve interference diversity and to mitigate jamming caused by a dominant interferer in a first sector who is assigned the same effective code as a user in another sector.

FIG. 6 illustrates a methodology 600 for dynamically evaluating interference and applying an appropriate interframe scrambling code recycling pattern to mitigate the interference, in accordance with various aspects. At 602, the presence and/or magnitude of dominant interferers can be evaluated. For instance, such evaluation can related to a number of devices assigned the same effective codes, or assigned the same Walsh codes, to determine actual and/or potential interference levels. At 604, an appropriate scrambling code variation pattern can be identified to mitigate cross-correlation of effective codes between user devices assigned duplicate effective codes in different sectors. The identified scrambling code variation pattern can be employed at 606 to mitigate jamming due to cross-correlation of codes between duplicately assigned users in different sectors.

For example, in a case where M interferers (e.g., duplicately assigned users in various sectors) are identified at 602, then N scrambling code sets can be employed to increase a frequency with which scrambling codes, and thus effective codes, are varied within a time frame. In this manner, anywhere from 2 to 160 segments within a time slot of a radio frame can be differently encoded without requiring reallocation of Walsh codes. Additionally, user devices and/or base stations can comprise data stores that store information related to scrambling code sequence sets, lookup tables related thereto, user device identity, Walsh code assignments, etc., in order to facilitate performing effective code variation in accordance with the various methodologies set forth herein.

FIG. 7 illustrates a methodology 700 for employing a interference level feedback information to facilitate dynamically increasing interference diversity and varying effective codes within a time slot of a radio frame, in accordance with one or more aspects. At 702, interference levels can be evaluated to detect one or more dominant interferers that have similar effective code allocations to a user device such that a high cross-correlation exists between effective codes, which can cause a jamming effect at a receiver to which to which the user device and the interfering device are transmitting. In order to combat the jamming effect, at 704, a scrambling code sequence recycling pattern can be identified. At 706, the recycling pattern can be implemented in an interfered user device to vary scrambling code sets within the transmission time slot to ensure that the interference is not carried through an entire radio frame. For instance, the recycling pattern can comprise 8 scrambling code sets, which can be cycled through within a single 160-segment time slot or across several time frames within a radio frame to reduce cross-correlation between effective codes assigned to the interfered device and an interfering device. Indeed, any number of segments between 2 and 160 can be allocated different scrambling code sequences, and any permutation of new and recycled scrambling code sets can be utilized to vary effective codes within the time slot.

At 708, a determination can be made regarding whether the jamming effect has been sufficiently reduced. Such determination can be made in conjunction with, for example, a predetermined acceptable threshold level of interference, above which interference is deemed unacceptable. If jamming has not been controlled (e.g., the interference level is still above the acceptable threshold level), then the method can revert to 704 for identification of a more aggressive scrambling code hopping pattern (e.g., 16 code variations per time slot, 24 variations per time slot, or any other suitable recycling pattern) to further reduce cross-correlation of coded signals between the interfered and interfering devices. If interference has been successfully reduced, then the method 700 can terminate and/or continuously be reiterated to facilitate continuous monitoring of interference and mitigation thereof when necessary.

It will be appreciated that, in accordance with one or more embodiments and/or methods described herein, inferences can be made regarding appropriate scrambling code recycling schemes, frequency of code variation within a time frame, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences regarding a number of scrambling code set variations to perform in a tie slot to increase interference diversity for an interfered user device and mitigate interference from a similarly assigned interfering device in another sector. Such inferences can be based at least in part, for example, a magnitude of interference caused by the dominant interferer, and number of interfering devices in nearby sectors, and the like. For instance, in a three-sector service area served by a single base station, there can be three user devices allocated the same Walsh code sequences and having similar or identical scrambling codes multiplied thereby such that all three devices have similar or identical effective codes. If two of the user devices interfere with the third, then a more aggressive scrambling code variation pattern (e.g., frequency of variation) can be inferred to be sufficient as compared to a scrambling code recycling pattern that might be applied in a scenario where only one dominant interfere is present. Such inferences can facilitate minimizing a time period for reaction to a detected dominant interferer, which in turn can facilitate providing a more robust user experience when communicating over a TD-CDMA wireless network.

According to another example, inferences can be made regarding whether or not to recycle a scrambling code sequence in a transmission time slot. For instance, in some cases a first scrambling code sequence set can be allocated to a first plurality of time slot segments, and can be substituted by a second scrambling code sequence set a some subsequent segment. The first set can then be substituted back into the variation rotation to replace the second set at some further subsequent segment to facilitate varying effective code assignments to the interfered user device to mitigate cross-correlation of effective codes between the interfered user device and an interfering user device in another sector. However, in cases where the interfered user device is heavily interfered, it can be desirable to exclude the initial scrambling code sequence set (e.g., the code set in use when the interference is detected) because such sequences can be partially responsible for the interference (e.g., such sequences, when multiplied by the allocated Walsh code set, result in a effective code with a high cross-correlation to the effective code(s) of the dominant interferer). Thus, inferences can be made that removing the initial scrambling code sequence set from a list of candidate variation sets is beneficial to improving interference diversity, and such scrambling code sets can be excluded from a recycling pattern. It will be appreciated that the foregoing examples are illustrative in nature and are not intended to limit the number of inferences that can be made, or the manner in which inferences can be made, in conjunction with various aspects of the systems and/or methods described herein.

Figure 8:
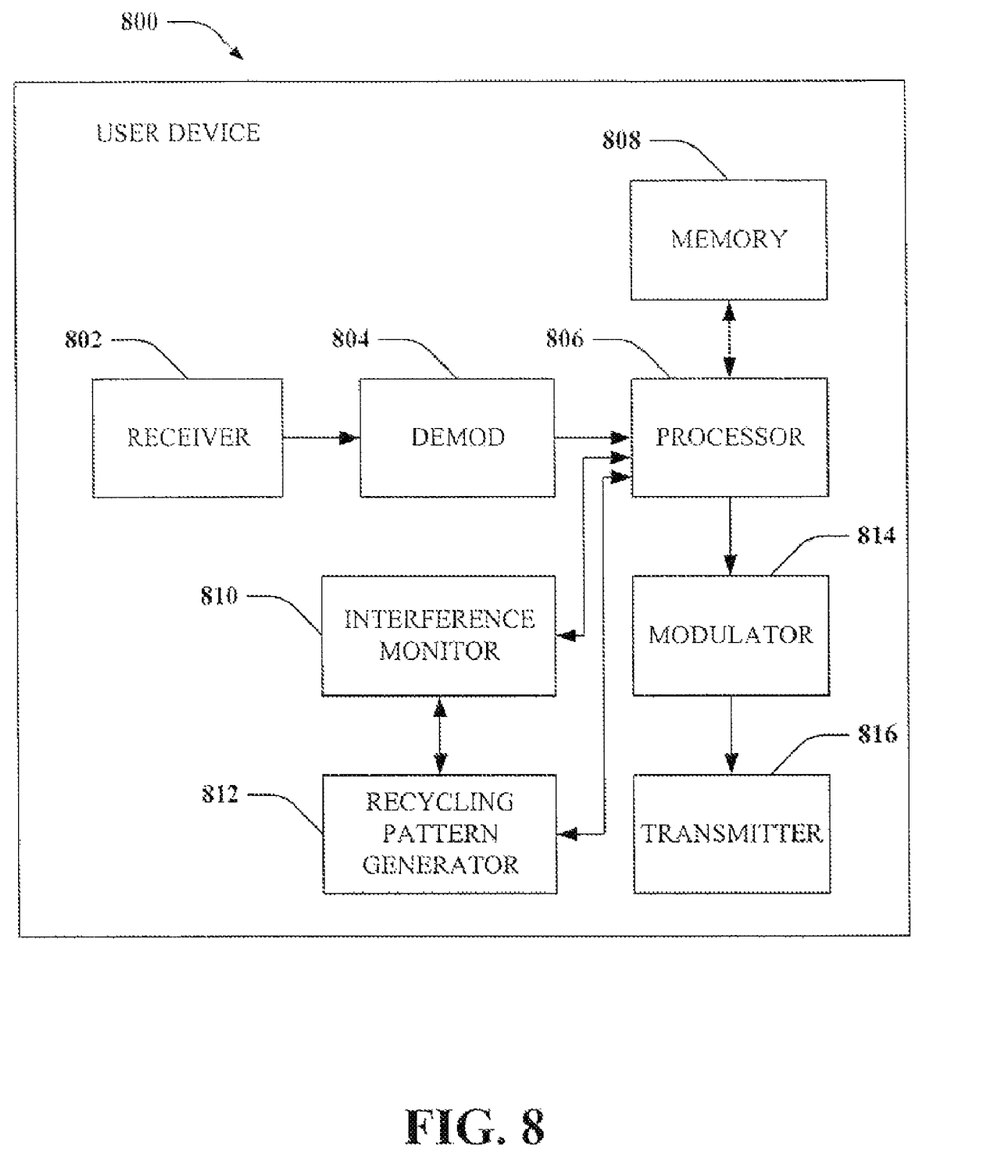
FIG. 8 is an illustration of a user device that facilitates hopping effective encodes within a time slot in a TDD-CDMA wireless communication environment, in accordance with one or more embodiments described herein.

FIG. 8 is an illustration of a user device 800 that facilitates hopping effective codes within a time slot in a TDD-CDMA wireless communication environment, in accordance with one or more embodiments described herein. User device 800 comprises a receiver 802 that receives a signal from, for instance, a receive antenna, and performs typical actions (e.g., filters, amplifies, downcoverts, etc.) on the received signal and digitizes the conditioned signal to obtain samples. A demodulator 804 can obtain received symbols for each symbol period, as well as provide received pilot symbols to a processor 806 for channel estimation and the like. Processor 806 can additionally be operatively associated with a modulator 814 and a transmitter 816 that facilitate modulating and transmitting information generated by processor 806.

Processor 806 can be a processor dedicated to analyzing information received by receiver component 802 and/or generating information for transmission by a transmitter 816, a processor that controls one or more components of user device 800, and/or a processor that both analyzes information received by receiver 802, generates information for transmission by transmitter 816 and controls one or more components of user device 800.

User device 800 can additionally comprise memory 808 that is operatively coupled to processor 806 and that stores information related to Walsh codes assigned to the user device 800, scrambling code sequence sets, effective code variation patterns, scrambling code sequence recycling protocols, or any other suitable information related to effective code hopping within a time slot as described herein. For example, memory can store one or more lookup tables comprising information related to Walsh code allocations, scrambling code assignments within one or more radio frames and/or time slots, and the like. Processor 806 can also be endowed with an intelligent component (not shown) that makes inferences regarding a successful scrambling code recycling pattern based on interference levels over time, in order to facilitate future selections of appropriate recycling patterns to increase interference diversity when necessary.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 is further coupled to an interference monitor 810 that can facilitate detecting a dominant interferer and/or evaluating interference levels based at least in part on information stored in memory 808 and/or information received and processed by processor 806. Interference monitor 810 can be operatically associated with recycling pattern generator 812, which can also be coupled to processor 806, and which can initiate a scrambling code sequence hopping protocol to increase interference diversity based on a indication that user device 800 is being interfered. Recycling pattern generator 812 can thus facilitate providing numerous permutations and/or combinations of scrambling code sequence sets for allocation to different segments within a transmission time frame in order to permit variation of effective codes (e.g., Walsh code×scrambling code) in a UMTS TDD communication environment.

Figure 9:
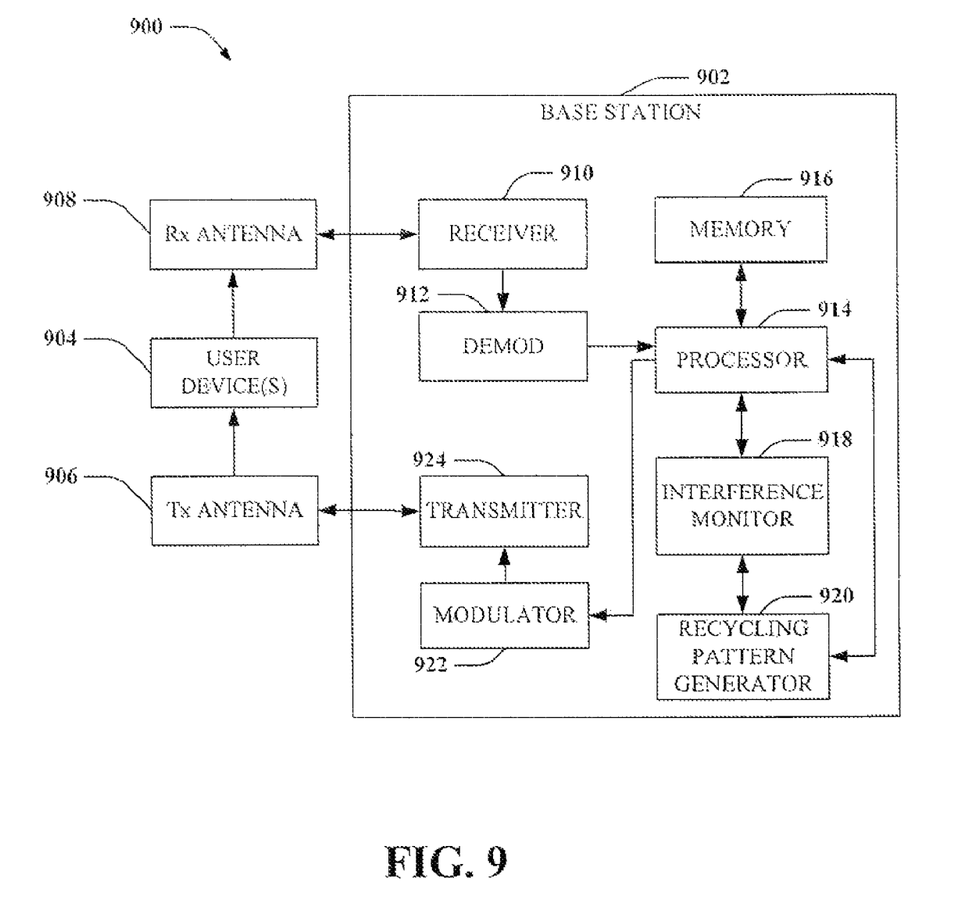
FIG. 9 is an illustration of a system that facilitates performing varying effective codes within a time slot to mitigate jamming by a dominant interferer in a TDD-CDMA wireless communication environment in accordance with one or more aspects set forth herein.

FIG. 9 is an illustration of a system 900 that facilitates performing varying effective codes within a time slot to mitigate jamming by a dominant interferer in a TDD-CDMA wireless communication environment in accordance with one or more aspects set forth herein. System 900 comprises a base station 902 that communicates with one or more user devices 904 via a transmit antenna 906 and a receive antenna 908, although more than one transmit and/or receive antenna can be employed in conjunction with various aspects. Base station 902 comprises a receiver 910 that receives information from receive antenna 908 and is operatively associated with a demodulator 912 that demodulates received information. Demodulated symbols can be analyzed by a processor 914 that is similar to the processor described above with regard to FIG. 8, and which is coupled to a memory 916 that stores information related to user devices, 904, a effective codes allocated thereto, scrambling code sequences, recycling patterns, interference level, lookup tables comprising information related to the foregoing, and/or any other suitable information related to scrambling code-Walsh code variation within a time slot as described herein.

Processor 914 is further coupled to an interference monitor 918 that can monitor interference levels at all devices 904 served by base station 902, etc., to assist a modulator 922 and/or transmitter 924 in base station 902 to appropriately modulate and transmit a communication signal to user device 904 via transmit antenna 906. Base station 902 still further comprises a scrambling code recycling pattern generator 920 that varies scrambling code sequences within a transmission time slot according to a pattern to communicate with a given user device 940. Based on such information, base station 902 can transmit to user device 904 using its associated scrambling code at a given point in a transmission. Still furthermore, base station 902 can broadcast a refresh signal to an interfered user device to refresh the user device's encoding scheme to utilize a new, more suitable scrambling code pattern upon detection of unacceptable interference by the interference monitor 918. In this manner, scrambling code variation within a time slot can be performed by the base station 902 and/or by a user device 904, which can be similar the user device described with regard to FIG. 8.

Figure 10:
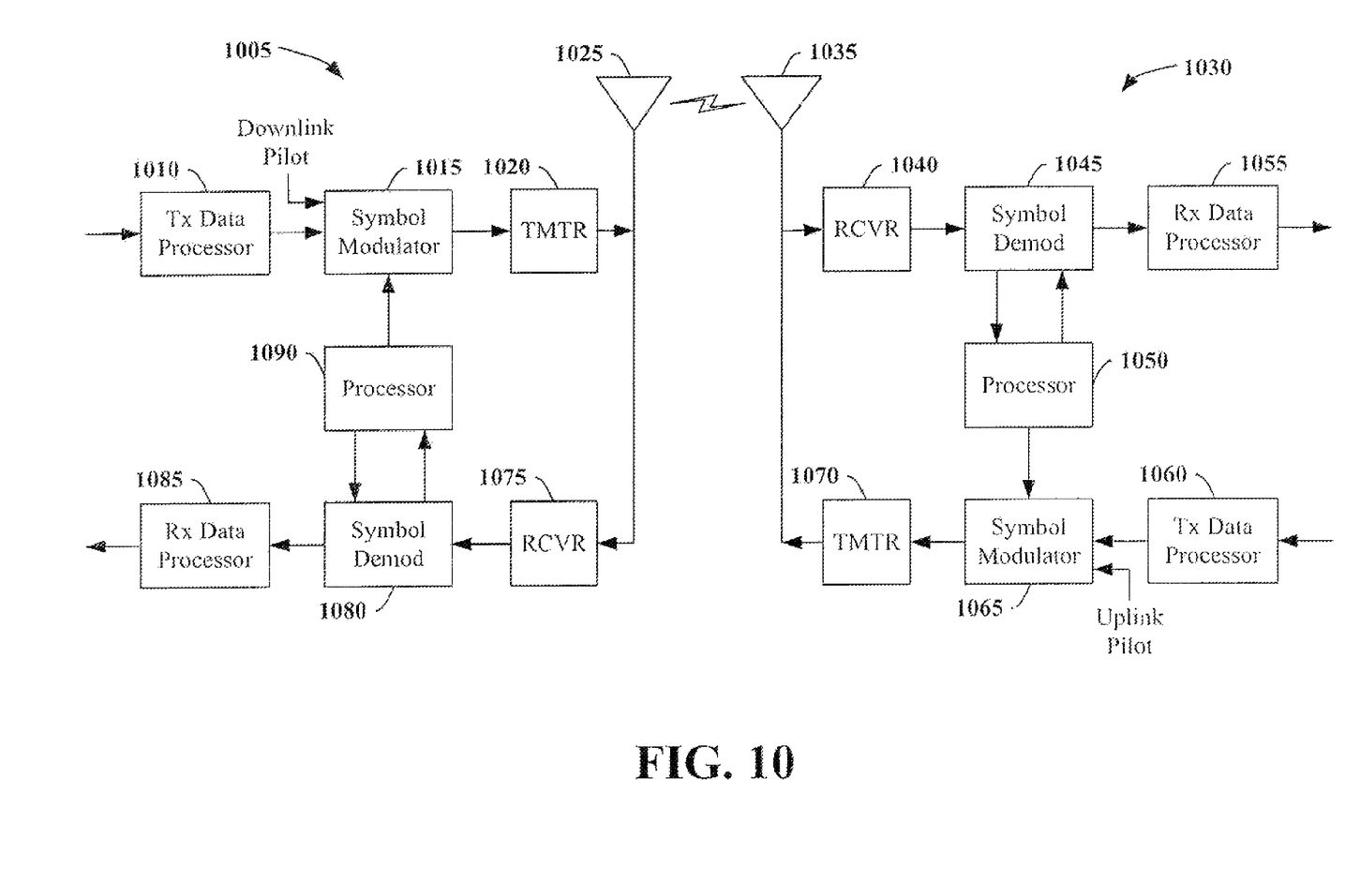
FIG. 10 is an illustration of a wireless network environment that can be employed in conjunction with the various systems and methods described herein.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-4 and 8-9) and/or methods (FIG. 5-7) described herein to facilitate wireless communication there between.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplex (FDM), or code division multiplexed (CDM).

TMTR 1020 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency downconverts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulate (i.e., symbol demaps), deinterleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1030. A processor 1090 performs channel estimation for each active terminal transmitting on the uplink.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing device (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed descriptions or the claims, such term is intended to be inclusive in a manner similar to the term "comprising" as "comprising" is interpreted when employed as a transitional word in a claim.

What is claimed is:

1. A method of varying scrambling codes within a radio frame time slot for a user device in a wireless communication environment, comprising:
    detecting interference of the user device;
    varying a scrambling code sequence employed to multiply a Walsh code assigned to the user device at least once within a transmission time slot; and
    determining whether detected interference has been brought below a predetermined acceptable interference level by scrambling code variation.

2. The method of claim 1, further comprising employing at least two different scrambling code sequence sets within the time slot.

3. The method of claim 2, further comprising multiplying at least one Walsh code assigned to the user device by a first scrambling code sequence to generate an effective code for transmitting a signal within the time slot.

4. The method of claim 3, further comprising multiplying the Walsh code by at least a second scrambling code sequence at a subsequent transmission time within the time slot to vary the effective code utilized for transmission within the time slot.

5. The method of claim 1, further comprising employing a 2560-Chip time slot.

6. The method of claim 1, further comprising dividing the time slot into 160 16-chip segments.

7. The method of claim 6, further comprising employing between 2 and 160 different scrambling code sequence sets to scramble the 160 16-chip segments.

8. The method of claim 1, further comprising increasing a frequency of scrambling code variation within the time slot upon a determination that interference is still above the predetermined acceptable threshold level.

9. An apparatus in a user device that facilitates effective code hopping in a wireless communication environment, comprising:
    a memory that stores information comprising scrambling code variation patterns;
    a processor, coupled to the memory, that varies scrambling code assignments to a user device at least once per time slot during a transmission frame;
    an interference monitoring component that assesses when an interference level is above a predetermined threshold level; and a recycling pattern generator that generates scrambling code sequence variation patterns for allocation to segments within the time slot during a transmission event;

wherein the processor determines an appropriate scrambling code recycling pattern to apply to a time slot for the user device based at least in part on information received from the interference monitoring component.

10. The apparatus of claim 9, wherein the recycling pattern generator generates scrambling code recycling patterns comprising from 2 to 160 scrambling code sequence sets for allocation to segments in the time slot.

11. The apparatus of claim 9, wherein the time slot is one of 15 time slots in a radio frame and comprises 160 16-chip-long segments.

12. The apparatus of claim 9, wherein the memory stores one or more lookup tables comprising information related to user delivery identity, Walsh code assignments, scrambling code allocations, detected interference events, and scrambling code recycling patterns.

13. An apparatus in a user device that facilitates scrambling code variation within a time slot in a wireless communication environment, comprising:

means for detecting interference at the user device caused by a dominant user device with a similar code assignment in another sector;

means for varying scrambling code sequences used to multiply Walsh codes assigned to the user device during a communication time slot, wherein the means for varying scrambling code sequences employs at least two different scrambling code sequences to vary the scrambling code sequences allocated to the user device at least once per time slot; and means for determining whether scrambling code sequence variation has reduced interference below a predetermined threshold level.

14. The apparatus of claim 13, further comprising means for increasing scrambling code sequence variation in the same or a subsequent time slot if the interference has not been reduced to a level below the predetermined threshold level.

15. The apparatus of claim 13, further comprising means for multiplying a Walsh code assigned to the user device by an allocated scrambling code sequence to produce an effective code for transmitting a signal.

16. A non-transitory computer-readable medium storing a computer program, wherein execution of the computer program is for:

detecting interference at a user device;

varying a scrambling code sequence employed to multiply a Walsh code assigned to the user device at least once within a transmission time slot; and determining whether detected interference has been brought below a predetermined acceptable interference level by scrambling code variation.

17. The computer-readable medium of claim 16, wherein execution of the computer program is also for employing at least two different scrambling code sequence sets within the time slot.

18. The computer-readable medium of claim 16, wherein execution of the computer program is also for employing between 2 and 160 different scrambling code sequence sets to scramble 160 16-chip-long segments in the time slot.

19. The computer-readable medium of claim 16, wherein execution of the computer program is also for determining whether detected interference has been reduced to a level below a predetermined threshold level after scrambling code variation.

20. The computer-readable medium of claim 19, wherein execution of the computer program is also for increasing a frequency of scrambling code variation within the time slot upon a determination that interference is not reduced to a level below the predetermined threshold level.

21. A processor that executes instructions for performing effective code hopping within a time slot of a radio frame in a communication environment, the instructions comprising:

detecting interference at a user device;

varying a scrambling code sequence, employed to multiply a Walsh code assigned to the user device, at least once within a transmission time slot; and determining whether detected interference has been reduced to a level below a predetermined threshold level after scrambling code variation.

22. The processor claim 21, further comprising instructions for employing at least two different scrambling code sequence sets within the time slot.

23. The processor of claim 21, further comprising instructions for employing from 2 to 160 different scrambling code sequence sets to scramble the 160 16-chip segments.

24. The processor of claim 21, further comprising instructions for increasing a frequency of scrambling code variation within the time slot upon a determination that interference is not reduced to a level below the predetermined threshold level.

* * * * *